(12) United States Patent
Vasquez et al.

(10) Patent No.: US 7,219,687 B2
(45) Date of Patent: May 22, 2007

(54) RESETTABLE BI-STABLE THERMAL VALVE

(75) Inventors: John A. Vasquez, Chandler, AZ (US); Todd C. Garrod, Gilbert, AZ (US)

(73) Assignee: Honeywell International, Inc., Morristown, NJ (US)

( * ) Notice: Subject to any disclaimer, the term of this patent is extended or adjusted under 35 U.S.C. 154(b) by 283 days.

(21) Appl. No.: 10/916,799

(22) Filed: Aug. 11, 2004

(65) Prior Publication Data

US 2007/0028964 A1    Feb. 8, 2007

Related U.S. Application Data (60) Provisional application No. 60/516,177, filed on Oct. 31, 2003.

(51) Int. Cl.
*F16K 17/38* (2006.01)

(52) U.S. Cl. .................................. 137/457; 137/463

(58) Field of Classification Search ................ 137/457, 137/463
See application file for complete search history.

(56) References Cited

U.S. PATENT DOCUMENTS

| | | | | |
|---|---|---|---|---|
| 1,479,789 | A * | 1/1924 | Collin .......................... | 137/79 |
| 2,425,000 | A | 8/1947 | Paget | |
| 2,717,494 | A * | 9/1955 | Doeg .......................... | 137/457 |
| 3,143,126 | A * | 8/1964 | Terry ............................ | 137/94 |
| 3,313,312 | A * | 4/1967 | Weese ......................... | 137/457 |
| 4,318,509 | A | 3/1982 | Patrick et al. | |
| 4,549,717 | A * | 10/1985 | Dewaegheneire ........... | 137/457 |
| 4,699,314 | A | 10/1987 | Faurie | |
| 4,735,056 | A | 4/1988 | Goodman | |
| 4,775,117 | A | 10/1988 | Standke | |
| 4,802,621 | A | 2/1989 | Standke | |
| 6,085,871 | A | 7/2000 | Karamata | |
| 6,241,231 | B1 | 6/2001 | Schron, Jr. et al. | |
| 6,367,253 | B2 | 4/2002 | Kutlucinar | |
| 6,550,495 | B1 * | 4/2003 | Schulze .................... | 137/614.2 |
| 6,584,940 | B1 | 7/2003 | Khadkikar et al. | |

FOREIGN PATENT DOCUMENTS

| | | | | |
|---|---|---|---|---|
| GB | 2107829 A * | 5/1983 | ................ | 137/457 |
| WO | WO 00/04310 | * | 1/2000 | |

* cited by examiner

*Primary Examiner*—Stephen M. Hepperle
(74) *Attorney, Agent, or Firm*—Ingrassia Fisher & Lorenz (57) ABSTRACT

A resettable thermal valve for controlling the flow of a fluid therethrough comprises a valve assembly housing having a fluid passageway therethrough and a valve coupled to the valve assembly housing and disposed at least partially within the fluid passageway. The valve is moveable between an open position and a close position and is coupled to a resettable, temperature sensitive linear actuator assembly. The linear actuator assembly enables the valve to move from the open position to the closed position when it is heated to a predetermined temperature.

23 Claims, 5 Drawing Sheets

RESETTABLE BI-STABLE THERMAL VALVE

CROSS-REFERENCES TO RELATED APPLICATIONS

This application claims the benefit of U.S. Provisional Application No. 60/516,177, filed Oct. 31, 2003.

TECHNICAL FIELD

The present invention relates to thermal valves and, more particularly, to a resettable, bi-stable, thermal valve for use in a jet engine aircraft.

BACKGROUND

Bi-stable thermal control valves that open or close when fluid conducted therethrough reaches a predetermined temperature are known and are commonly employed as over temperature shut-off valves. For example, pneumatic thermal bi-stable valves are employed in aircraft bleed air systems for cabin pressurization, air conditioning, system cooling, anti-icing, and other such purposes to ensure that hot bleed air is diverted from, for example, temperature sensitive aircraft components (e.g. the wings).

Known pneumatic thermal bi-stable valves employ thermal fuse plugs made of eutectic alloys that abruptly melt at a predetermined temperature. Generally, eutectic fuse plugs are positioned within pneumatic thermal control valves to prevent the movement of a spring-loaded flapper, a body capable of swinging between an open position that permits airflow and a closed position that blocks airflow. When bleed air heats the eutectic fuse plug to its melting point, the plug melts away and the flapper is permitted to swing shut (i.e. trip) and obstruct airflow.

Though thermal control valves of the type described above are effective for decreasing airflow when bleed air reaches a particular temperature, the eutectic plugs they employ must be replaced after melting before a tripped flapper can be reset to its open position. This requires valve removal, valve disassembly, insertion of a new eutectic plug, and valve reassembly, a time-consuming and expensive process. Furthermore, such control valves cannot be tested to ensure proper operation without heating and melting the eutectic plug.

It should thus be appreciated that it would be desirable to provide an improved thermal control valve capable of being reset and reused without valve removal and part replacement.

BRIEF SUMMARY

The present invention provides a resettable thermal valve assembly for controlling the flow of a fluid therethrough. The resettable thermal valve assembly comprises a valve assembly housing having a fluid passageway and a valve coupled to the valve assembly housing and at least partially disposed within the fluid passageway. The valve is moveable between an open position and a closed position, and is coupled to a resettable temperature sensitive linear actuator assembly. The linear actuator assembly permits the valve to move from the open position to the closed position when it is heated to a predetermined temperature.

In one embodiment, and by way of example only, there is provided a resettable thermal valve assembly for controlling the flow of a fluid therethrough. The resettable thermal valve assembly comprises a valve assembly housing having a fluid passageway and a valve hingedly coupled to the valve assembly housing and at least partially disposed within the fluid passageway. The valve is moveable between an open position and a closed position, and is coupled to a resettable temperature sensitive linear actuator assembly. The linear actuator assembly comprises a shape memory alloy device and enables the valve to move from the open position to the closed position when the shape memory alloy device is heated to a predetermined temperature. An actuator is coupled to the valve and may be accessed from the exterior of the valve assembly housing to return the valve to its open position.

In another embodiment, and by way of example only, there is provided a temperature sensitive resettable linear actuator. The temperature sensitive resettable linear actuator comprises a linear actuator housing, a support shaft, and a shape memory alloy device. The support shaft has a first end portion that is configured to longitudinal move within the linear actuator housing and a second end portion that extends from the linear actuator housing. The support shaft is configured to translate between an extended position and a retracted position. The shape memory alloy device is positioned within the linear actuator housing and is coupled to the first end portion to move the support shaft from the extended position to the retracted position when the shape memory alloy device reaches a predetermined temperature.

Other independent features and advantages of the preferred embodiments will become apparent from the following detailed description, taken in conjunction with the accompanying drawings which illustrate, by way of example, the principles of the invention.

BRIEF DESCRIPTION OF THE DRAWINGS

The present invention will hereinafter be described in conjunction with the following figures, wherein like reference numerals denote like elements, and.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
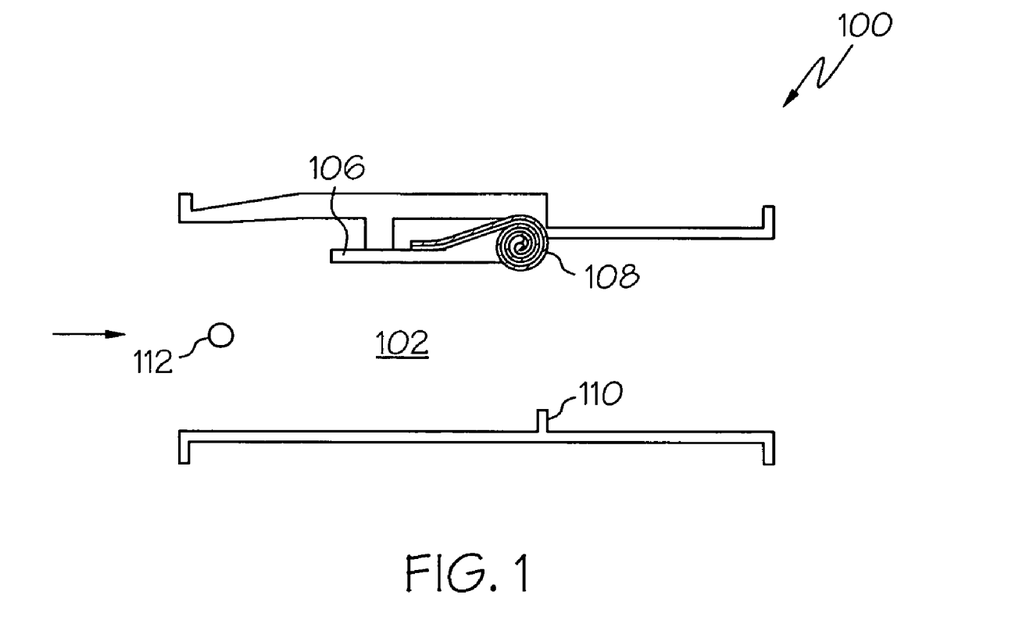
FIGS. 1 and 2 are functional side cross-sectional views of the inventive thermal valve assembly in open and closed positions, respectively.
Figure 2:
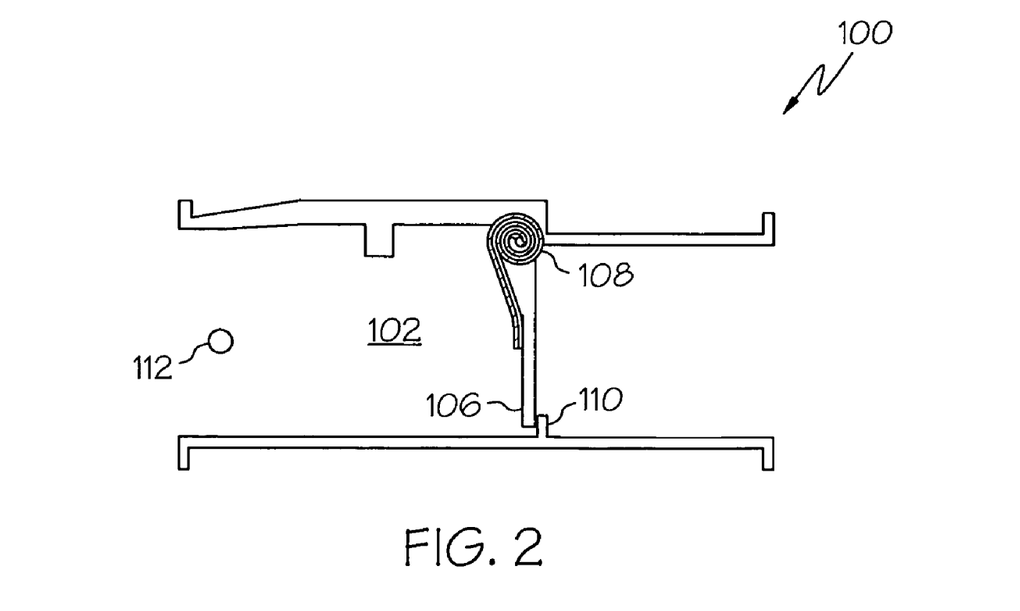

FIGS. 1 and 2 are side cross-sectional views of a resettable thermal valve assembly 100 in open and closed positions, respectively, in accordance with the present invention. Thermal valve assembly 100 comprises a fluid passageway 102 for conducting a fluid when valve assembly 100 is open as is shown in FIG. 1. Valve assembly 100 closes when flapper 106 rotates to block fluid flow as is shown in FIG. 2. Flapper 106 is biased closed by spring 108 (e.g. a coil spring) to abuttingly engage stop 110. After flapper 106 has swung into the closed position, it is held in place by spring 108 and the force exerted on flapper 106 by the incoming fluid.

Figure 3:
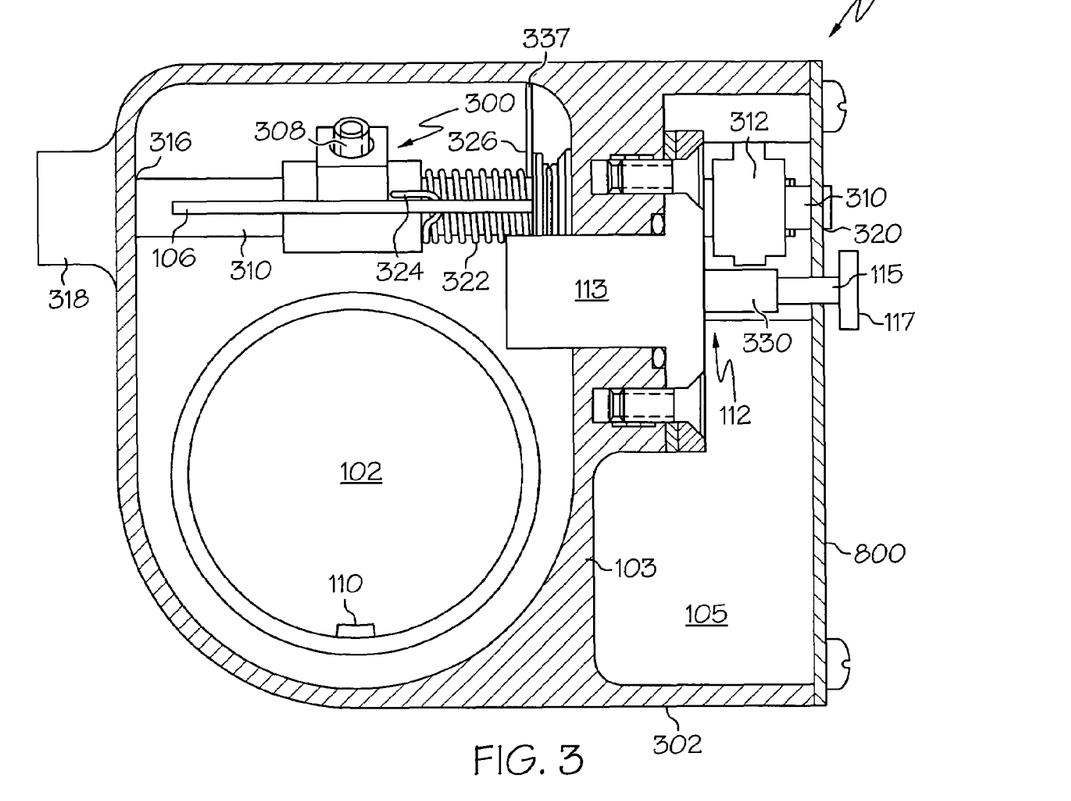
FIG. 3 is a front cross-sectional view of the inventive thermal valve assembly.

In a preferred embodiment shown in FIGS. 1–3, flapper 106 is of a size and shape to substantially prevent fluid from passing through passageway 102. If desired, however, the shape and size of flapper 106 may be varied to vary the extent to which flapper 106 obstructs fluid flow. It should be appreciated that, although flapper 106 is shown hinged at one end thereof in FIGS. 1–3, flapper 106 may be configured within passageway 102 for movement therein in other configurations suitable for controlling the flow of a fluid through passageway 102 (e.g. in a butterfly configuration).

As suggested above, valve assembly 100 is bi-stable; i.e., it is capable of being placed in an open stable state and a closed stable state. Valve assembly 100 is tripped when it transitions from the open state (FIG. 1) to the closed state (FIG. 2). In the open state, flapper 106 is prevented from closing by a resettable temperature sensitive linear actuator assembly 112. Resettable temperature-sensitive linear actuator 112 will permit flapper 106 to close, however, when heated by the fluid passing through passageway 102 to a predetermined temperature, as will be more fully described below.

FIG. 3 is a cross-sectional view of a resettable thermal valve assembly 100 (shown in an open position) in accordance with a first embodiment of the present invention. Thermal valve assembly 100 comprises a flapper assembly 300, a thermal linear actuator assembly 112, and a valve assembly housing 302 comprising a fluid passageway 102, a partition 103, and a compartment 105. Flapper assembly 300 comprises a lever arm 312 fixedly coupled on a first cylindrical rotatable shaft 310 and a flapper 106 fixedly coupled to shaft 310 by means of a fastening device 308 (e.g. a set screw). Lever arm 312 and flapper 106 extend radially outward from rotatable shaft 310; thus, in FIG. 3, only a proximal end of lever arm 312 and flapper 106 can be seen. Rotatable shaft 310 extends through housing 302 including partition 103 and has a first end that is received through aperture 316 and secured therein by cap 318. A second end of shaft 310 is received through aperture 320, and a resilient member (e.g. a spring) 322 is positioned around a medial portion of the shaft. A first end of spring 322 comprises a foot 324 that abuttingly contacts flapper 106 proximate rotatable shaft 310. At its other end, spring 322 comprises an arm 326 that extends toward and fixedly engages housing 302 as is shown in FIG. 3 at 337. Spring 322 biases flapper assembly 300 toward the closed position. When thermal valve assembly 100 is in the open position shown in FIG. 3, flapper assembly 300 is prevented from rotating to the closed position by extended support shaft 330 of thermal linear actuator 112.

Figure 4:
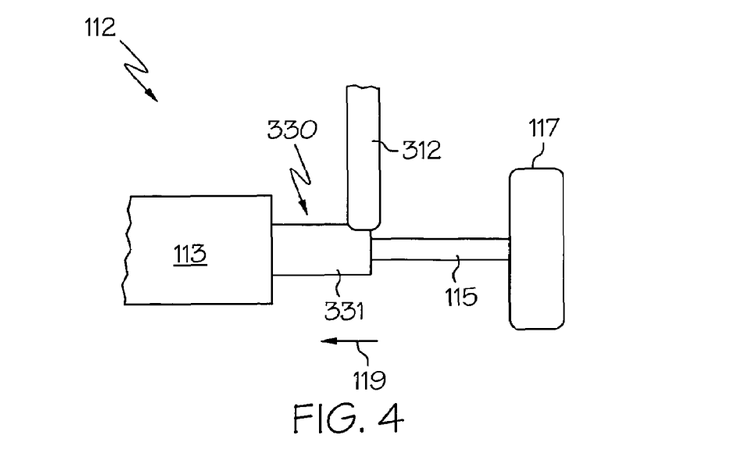
FIG. 4 illustrates in greater detail a portion of the linear actuator assembly and lever arm shown in FIG. 3.

FIG. 4 illustrates in greater detail a portion of the linear actuator assembly 112 and lever arm 312 shown in FIG. 3. As can be seen in FIG. 4, thermal linear actuator assembly 112 comprises a linear actuator housing 113 within which a shaft 330 is slidably mounted. A stem 115 is fixedly coupled to shaft 330 (e.g. threadably, etc.) and extends through housing 302 (FIG. 3) where it is coupled to a manual actuator (i.e. reset knob) 117. In a manner to be described more fully below in connection with FIGS. 5–7, thermal linear actuator assembly 112 will cause shaft 330 and the stem/knob assembly to move in the direction of arrow 119 when heated to a predetermined temperature by the conducted fluid.

Still referring to FIG. 4, it can be seen that the exposed portion 331 of support shaft 330 (i.e., the portion of shaft 330 extending outward from linear actuator housing 113) has a larger diameter than does stem 115. When support shaft 330 is extended, the end of lever arm 312 is supported by shaft 330 and prevented from rotating under the force of spring 322. Therefore, when support shaft 330 is extended, shaft 310 and flapper 106 are prevented from rotating and the valve remains open. When the temperature of the fluid passing through passageway 102 reaches a predetermined temperature, however, shaft 330 moves in the direction of arrow 119 (i.e. retracts) and stem 115 moves beneath lever 312. Due to the reduced diameter of stem 115, lever 312 does not contact and support stem 115. Thus, when shaft 330 retracts, flapper assembly 300 rotates into the closed position.

Figure 5:
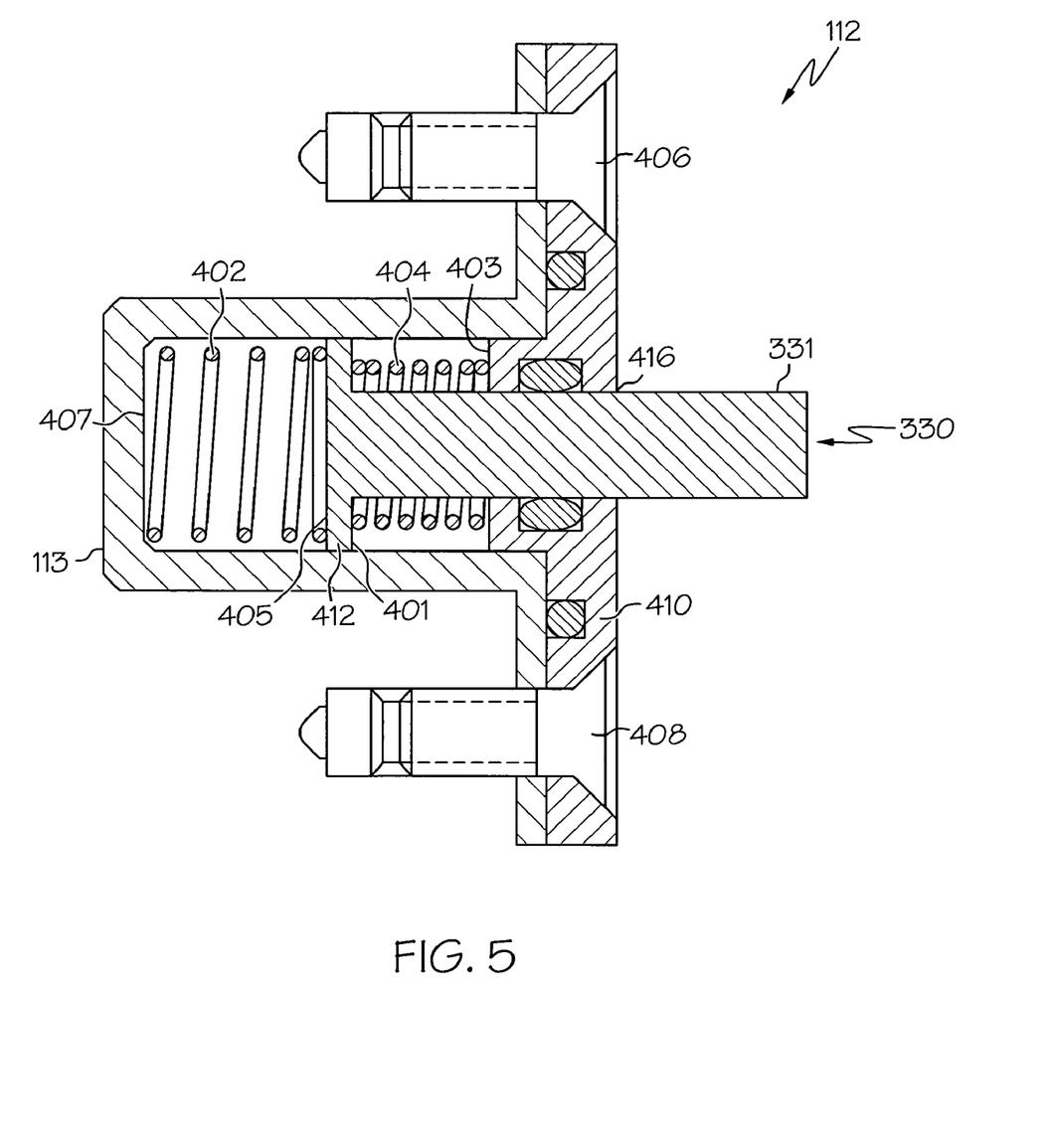
FIG. 5 is a detailed cross-sectional view of a first embodiment of a thermal linear actuator suitable for use in conjunction with the inventive thermal valve assembly shown in FIG. 3.

FIG. 5 is a cross-sectional view of a first type of thermal linear actuator 112 suitable for use in the valve shown in FIG. 3. In this exemplary embodiment, thermal linear actuator 112 comprises a linear actuator housing 113, a resilient member (e.g. coil spring) 402, a shape memory alloy (SMA) device (i.e. spring) 404, and support shaft 330. Linear actuator housing 113 is coupled by way of fastening devices 406 and 408 (e.g. screws) to a linear actuator end cap 410. Support shaft 330 comprises a piston 412 that is contained within linear actuator housing 113. SMA spring 404 is compressed between a first surface 401 of piston 412 and an inner wall 403 of linear actuator end cap 410. Also disposed within linear actuator housing 113 is spring 402. Spring 402 is compressed between a second surface 405 of piston 412 and an inner wall 407 of housing 113 and exerts a force on piston 412 opposite to that exerted by SMA spring 404. That is, spring 402 acts as a support shaft biasing member and biases support shaft 330 normally extended. Support shaft 330 is slidably mounted within housing 113 and passes through an aperture 416 provided within end cap 410 as is shown in FIG. 3.

As described previously, support shaft 330 at least partially retracts into housing 113 when thermal linear actuator 112 is heated to a predetermined temperature by the fluid flowing through passageway 102 (FIGS. 1–3). Thermal linear actuator 112 functions this way due to the unique physical properties of SMA device 404 employed therein. That is, when heated to a predetermined temperature, SMA undergoes a reversible material phase transformation from the austenite state to the martensite state. While heated and in the austenite state, the SMA may be fashioned into a wire which may, in turn, be formed and annealed into a desired shape (e.g. the spring configuration utilized by SMA spring 404). After cooling, the SMA returns to its martensite form. In the martensite form, the SMA may be easily deformed. If the SMA is so deformed and then again heated to the predetermined temperature, it will attempt to revert back to its annealed shape.

From the above it should be appreciated that, while below the predetermined temperature, SMA spring 404 is in the malleable, martensitic form. In this form, SMA spring 404 is compressed by spring 402 between an inner wall 403 of linear actuator end cap 410 and surface 401 of piston 412. After being heated to a predetermined temperature by the fluid passing through the valve, SMA spring 404 changes from its martensite form to its austinite form and attempts to return to its longer annealed state. SMA spring 404 thus expands and exerts a force on piston 412 opposite that exerted by spring 402. This causes spring 402 to compress and support shaft 330 to retract into housing 113 and thereby disengage from lever arm 312 (FIG. 3). Spring 322 (FIG. 3) then causes flapper assembly 300 (FIG. 3) to rotate in the manner described above and thermal valve assembly 100 (FIG. 3) closes.

As SMA spring 404 cools below the predetermined temperature, spring 404 reverts to the malleable, martensitic form. During this reversion, spring 402 compresses SMA spring 404 between inner wall 403 and surface 401 and support shaft 330 extends. If the valve has already tripped, shaft 330 must be again retracted (e.g. by pushing knob 117 in the direction of arrow 119 as shown in FIG. 4) before the valve may be reset as is described more fully hereinbelow. Furthermore, when the valve is in the open position, it may be manually tripped at any desired time by pushing knob 117 in the direction of arrow 119.

SMA spring 404 is disposed within the thermal valve assembly such that it is heated by the fluid passing therethrough. In the exemplary embodiments, SMA spring 404 is placed within passageway 102 (FIGS. 1–3) and positioned such that its longitudinal axis is substantially perpendicular to the direction of fluid flow. For greater fluid exposure, the SMA may be molded into a shape that has a relatively large surface area-to-volume ratio, such as the spring configuration shown in FIG. 5. It should be appreciated, however, that the SMA component may take any suitable form and may be situated at anyone of numerous locations within or proximate the inventive thermal valve, so long as the SMA component is operatively coupled to the support shaft and heated by the conducted fluid.

Figure 6:
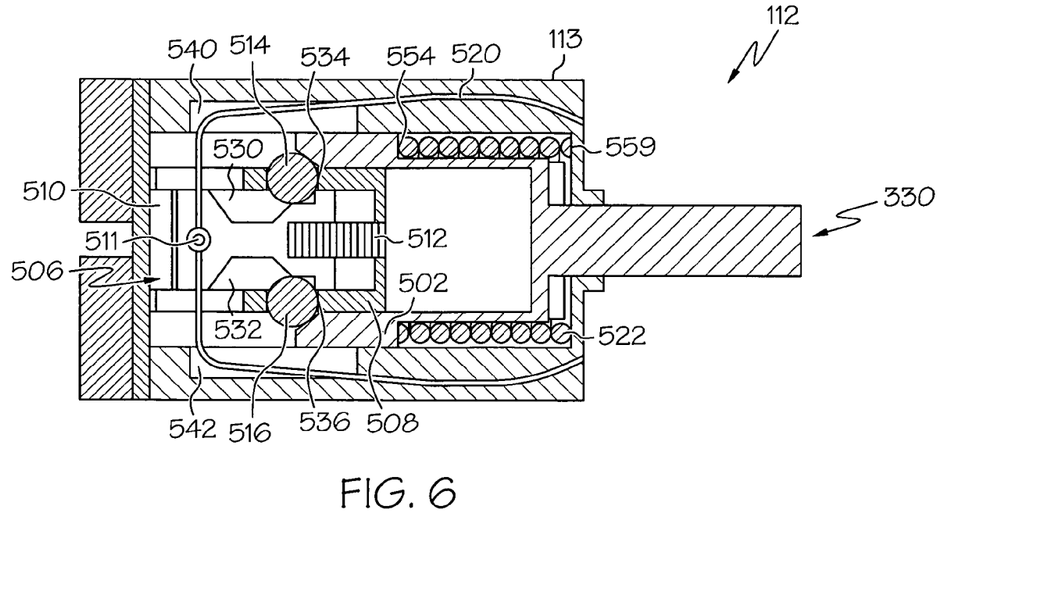
FIGS. 6 and 7 are detailed cross-sectional views of a second embodiment of a thermal linear actuator in extended and retracted positions, respectively, suitable for use in conjunction with the inventive thermal valve assembly shown in FIG. 3.
Figure 7:
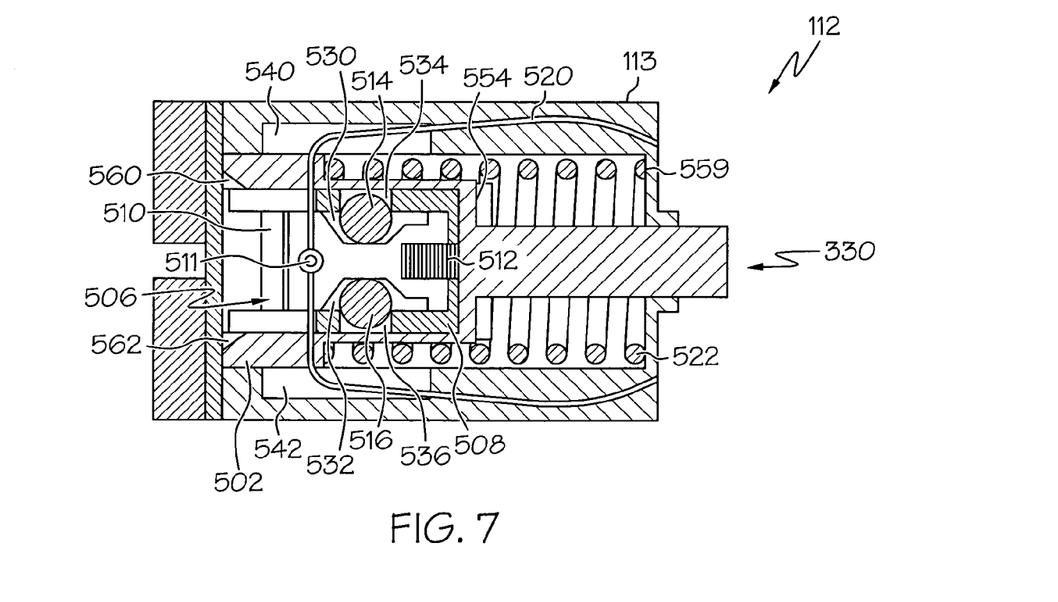

FIGS. 6 and 7 are cross-sectional views of a second embodiment of a thermal linear actuator 112 in the extended (valve closed) and retracted (valve open) positions, respectively. In this embodiment, support shaft 330 is held in the retracted state by spring 559 until shaft 330 is manually re-extended to reset the inventive valve assembly.

Referring to FIG. 6, thermal linear actuator 112 comprises a housing 113 and a support shaft 330 coupled to a piston-receiving cylinder 502. Two flow channels 540 and 542 are provided within housing 113 through which fluid passing through passageway 102 (FIGS. 1–3) may flow. Cylinder 502, and therefore support shaft 330, is configured to slide within housing 113. A piston resilient member (e.g. a spring) 522 is disposed within housing 113 around support shaft 330 and is restrained between cylinder 502 and housing 113. Piston spring 522 act as a support shaft biasing member and biases support shaft 330 normally retracted. A release mechanism (i.e. piston assembly) 506 is slidably disposed within housing 113 and is capable of assuming a first position shown in FIG. 6 wherein shaft 330 is maintained in an extended position relative to linear actuator housing 113, and a second position shown in FIG. 7 wherein shaft 330 is maintained substantially retracted into linear actuator housing 113. Piston assembly 506 is slidably mounted within piston-receiving cylinder 502. Piston spring 522 has a first end that abuts inner wall 559 of housing 113 and a second end that abuts a protruding edge provided around piston-receiving cylinder 502.

Piston assembly 506 comprises a piston cap 508, an inner piston resilient member (e.g. a spring) 512, and an inner piston body 510 configured for slidable movement within piston cap 508. An SMA wire 520 is coupled to housing 113 and to piston body 510 at 511. SMA wire 520 may be heated to a predetermined temperature by fluid passing through flow channels 540 and 542. The annealed configuration of SMA wire 520 is shorter along the longitudinal axis of thermal linear actuator 112 (FIG. 7) than is its deformed shape. Thus, when sufficiently heated, SMA wire 520 exerts a longitudinal force on inner piston body 510 that causes body 510 to move into piston cap 508 thereby compressing inner piston spring 512.

Two apertures 534 and 536 (shown most clearly in FIG. 7) are provided through sidewalls of piston cap 508 for positioning locking mechanisms; i.e. two ball bearings 514 and 516, respectively. As body 510 is drawn into cylinder 502 by SMA wire 520, ball bearings 514 and 516 roll along the outer surface of inner piston body 510 until apertures 534 and 536 become aligned with and are resiliently urged into ball bearing slots or cavities 530 and 532, respectively, thus permitting cylinder 502 (and therefore shaft 330) to retract into housing 113 under the force of spring 522 as is shown in FIG. 7. Until this occurs, bearings 514 and 516 protrude from piston assembly 506 (FIG. 7) and thus prevent shaft 330 from retracting by abuttingly engaging notches 560 and 562 provided in piston-receiving cylinder 502.

FIG. 7 illustrates bearings 514 and 516 withdrawn into respective recesses 530 and 532 of piston assembly 506. In this configuration, bearings 514 and 516 are constrained within respective recesses 530 and 532 by an inner surface of cylinder 502 and thus prevent inner piston body 510 from moving out of piston end cap 508 under the force of compressed inner piston spring 512 even when SMA wire 520 cools.

To reset thermal linear actuator 112 shown in FIGS. 6 and 7, shaft 330 is manually re-extended by manually manipulating actuator (i.e. reset knob) 117 in a direction opposite arrow 119 shown in FIG. 4. Pulling knob 117 in this way causes support shaft 330 to move out of housing 113, and notches 560 and 562 of cylinder 502 to move towards bearings 514 and 516, respectively. When notches 560 and 562 substantially align with piston cap apertures 534 and 536, respectively, bearings 514 and 516 are drawn out of bearing slots 530 and 532 and re-engage notches 560 and 562, respectively. Substantially concurrently, inner piston body 510 moves out of inner piston cap 508 under the force of compressed spring 512. In this configuration, bearings 514 and 516 prevent shaft 330 from again retracting under the influence of spring 522 as is shown in FIG. 6.

Although only a single SMA component (i.e. SMA wire 520) is shown in FIGS. 6 and 7, it should be appreciated that multiple SMA components may be employed. For example, a second SMA wire similar to SMA wire 520 may also be positioned within thermal linear actuator 112 (e.g. substantially orthogonal to wire 520) and coupled to inner piston body 510 if so desired.

Figure 8:
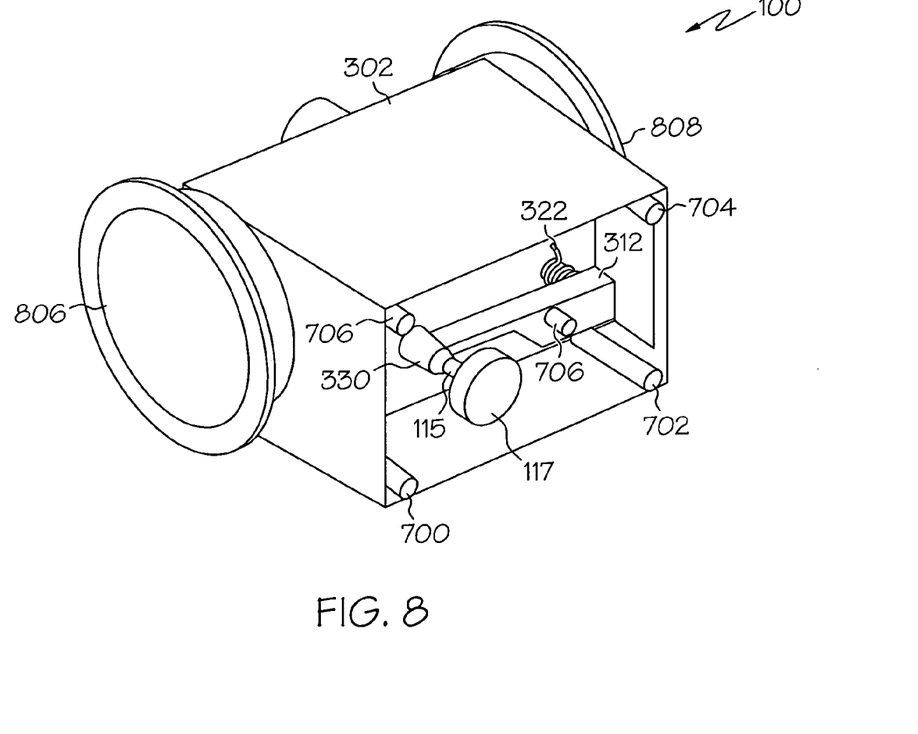
FIGS. 8 and 9 are respective cutaway and isometric views of the inventive thermal valve assembly depicted in FIG. 3.
Figure 9:
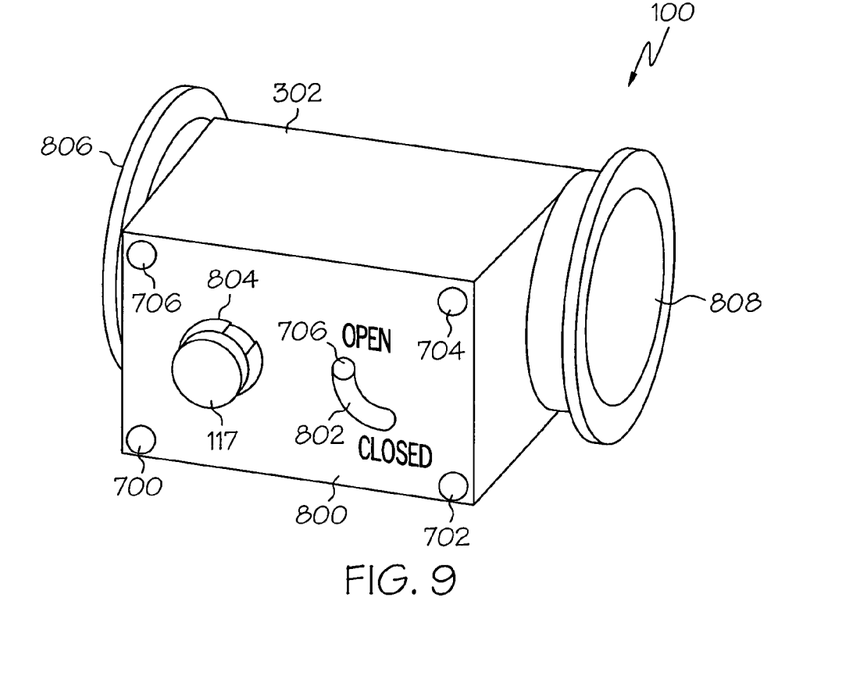

FIGS. 8 and 9 are respective cutaway and isometric views of resettable thermal valve assembly 100 in the open state. A cover 800, shown in FIG. 9, is coupled to housing 302 by way of fastening devices 700, 702, 704, and 708 (e.g. screws). As can be seen in FIG. 9, an aperture 804 is provided in cover 800 to permit reset knob 117 to be manipulated from the exterior of valve assembly 100. As described above, when support shaft 330 retracts, lever arm 312, no longer supported by support shaft 220, will rotate past knob stem 115 and the valve will close. In should be noted that, in the embodiment shown in FIGS. 8 and 9, spring 322 is optionally positioned on the opposite side of partition 103 to that shown in FIG. 3; i.e. between partition 103 and lever 312.

Protruding outward from lever arm 312 is a valve actuator or reset indicator stem 706. Stem 706 slides within slot 802

(FIG. 8) and serves two purposes. First, as can be most easily appreciated from FIG. 8, stem 706 provides visual indication of the status of thermal valve assembly 100; namely, whether the valve assembly is open (indicated when stem 706 is near the top of slot 802) or closed (indicated when stem 706 is near the bottom of slot 802). For greater clarity, position labels may be displayed on side cover 800 of thermal valve assembly 100 (e.g. text such as "open" and "closed" as suggested in FIG. 8). Second, when utilizing the embodiment of thermal linear actuator 112 shown in FIGS. 6 and 7, stem 706 may be utilized to manually reset (open) valve assembly 100 by (1) manually sliding stem 706 from the closed position to the open position and then (2) manually extracting (i.e. re-extending) support shaft 330 by pulling reset knob 117 outward. When utilizing the embodiment of thermal linear actuator 112 shown in FIG. 5, support shaft 330 must be retracted and held so while stem 706 is slid from the closed to open position before valve assembly 100 may be reset as described. This may be accomplished by delivering an electrical charge to the SMA element suitable to cause valve tripping, as described below.

Valve assembly 100 may be manually tripped by means of electric stimulation. In the embodiment shown in FIGS. 6 and 7, valve tripping may be accomplished by delivering a suitable electrical potential (e.g. approximately in the range of 7 to 9 volts direct current) across the SMA wire 520 via electrical leads (not shown). In this way, SMA wire 520 may be heated to the predetermined temperature to cause wire 520 to return to the austenite formed state and consequently cause support shaft 330 to retract and valve assembly 100 to close. In the exemplary embodiment shown in FIG. 5, valve tripping may be brought about by the above described electric stimulation or by simply depressing support shaft 330 by manually pushing in reset knob head 117.

The inventive resettable thermal valve assembly 100 may be tested to ensure that it will trip at the desired temperature. This may be accomplished by delivering an electrical charge to the SMA component (e.g. SMA spring 404 or SMA wire 520) in the above described manner and observing indicator-stem 706 to detect valve tripping.

The above described exemplary embodiments are especially suited for thermally controlling bleed air produced by a jet engine. If the inventive thermal valve is put to this use, it is desirable that the components of the valve assembly (especially the housing) be made of lightweight material (e.g. aluminum). Also, it is desirable that the SMA component (e.g. nickel titanium) have a suitable temperature threshold (e.g. 180 to 255 degrees Fahrenheit).

While the invention has been described with reference to the preferred embodiments, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

We claim:

1. A resettable thermal valve assembly comprising:
a valve assembly housing;
a fluid passageway through said valve assembly housing;
a flapper assembly coupled to said valve assembly housing and disposed at least partially within said fluid passageway, said flapper assembly comprising:
a first shaft rotatably mounted in said valve assembly housing; and
a flapper fixedly coupled to said first shaft for rotating from an open position and to a closed position;
a resettable, temperature sensitive linear actuator assembly coupled to said flapper assembly configured to permit said flapper to move from said open position to said closed position when heated to a predetermined temperature; and
a lever arm fixedly coupled at a first end thereof to said first shaft and configured to be supported at a second end thereof by said temperature sensitive linear actuator.

2. A resettable thermal valve assembly according to claim 1 further comprising an actuator coupled to said flapper assembly for moving said flapper from said closed position to said open position.

3. A resettable thermal valve assembly according to claim 2 wherein said actuator comprises a manual actuator.

4. A resettable thermal valve assembly according to claim 3 wherein said manual actuator extends through said valve assembly housing so as to be manipulated from the exterior of said valve assembly housing.

5. A resettable thermal valve assembly according to claim 1 wherein said flapper assembly further comprises a resilient member coupled to said flapper for biasing said flapper into said closed position.

6. A resettable thermal valve assembly according to claim 5 wherein said resilient member is a coil spring positioned around said first shaft and resiliently coupled to said flapper and to said valve assembly housing.

7. A resettable thermal valve assembly according to claim 1 wherein said temperature sensitive linear actuator assembly comprises:
a linear actuator housing; and
a support shaft having a first end portion configured for longitudinal movement within said linear actuator housing and having a second end portion extending from said linear actuator housing, said support shaft configured to translate between an extended position for supporting said lever arm and a retracted position for releasing said lever arm.

8. A resettable thermal valve assembly according to claim 7 wherein said temperature sensitive linear actuator further comprises a shape memory alloy device at least partially disposed within said linear actuator housing and coupled to said first end portion for moving said support shaft from said extended position to said retracted position when said shape memory alloy device reaches said predetermined temperature.

9. A resettable thermal valve assembly according to claim 8 wherein said temperature sensitive linear actuator further comprises a support shaft biasing member substantially disposed within said linear actuator housing for biasing said support shaft into said extended position.

10. A resettable thermal valve assembly according to claim 9 wherein said shape memory alloy device is a coil spring.

11. A resettable thermal valve assembly according to claim 7 wherein said temperature sensitive linear actuator further comprises:
a support shaft biasing member within said linear actuator housing for moving said support shaft from said extended position to said retracted position;

a release mechanism configured for slidable movement within said linear actuator housing from a first location to maintain said support shaft in said extended position to a second location to maintain said support shaft in said retracted position; and a shape memory alloy device coupled to said release mechanism for moving said release mechanism to said second location when said shape memory alloy device reaches said predetermined temperature.

12. A resettable thermal valve assembly according to claim 11 wherein said manual actuator is coupled to said support shaft for moving said release mechanism from said second location to said first location to reset the temperature sensitive linear actuator.

13. A resettable thermal valve assembly according to claim 12 wherein said release mechanism is configured to oppose said support shaft biasing member when said release mechanism is in said first location and to release said support shaft biasing member when said release mechanism is in said second location.

14. A resettable thermal valve assembly according to claim 13 wherein first end portion of said support shaft has a receiving cavity therein and said release mechanism further comprises a locking mechanism which engages said support shaft proximate said receiving cavity to maintain the support shaft in its extended position when said release mechanism is in said first location, and is at least partially received within said receiving cavity when said release mechanism moves to said second location.

15. A resettable thermal valve assembly according to claim 14 wherein said shape memory alloy device is a wire.

16. A resettable thermal valve assembly according to claim 15 wherein said locking mechanism comprises at least one ball bearing.

17. A resettable thermal valve assembly, comprising:
a valve assembly housing;
a fluid passageway through said valve assembly housing;
a flapper assembly coupled to said valve assembly housing and disposed at least partially within said fluid passageway, said flapper assembly comprising:
a first shaft rotatably mounted in said valve assembly housing; and
a flapper fixedly coupled to said first shaft for rotating from an open position and to a closed position;
an actuator coupled to said flapper assembly for moving said flapper from said closed position to said open position;
a lever arm having a first end and a second end, said first end fixedly coupled to said first shaft;
a resettable, temperature sensitive linear actuator assembly coupled to said flapper assembly configured to permit said flapper to move from said open position to said closed position when heated to a predetermined temperature, comprising:
a linear actuator housing; and
a support shaft having a first end portion configured for longitudinal movement within said linear actuator housing and having a second end portion extending from said linear actuator housing, said support shaft configured to translate between an extended position for supporting said second end of said lever arm and a retracted position for releasing said second end of said lever arm.

18. A resettable thermal valve assembly, comprising:
a valve assembly housing;
a fluid passageway through said valve assembly housing;
a valve hingedly coupled to said valve assembly housing and disposed at least partially within said fluid passageway and moveable between an open position and a closed position;
a resettable temperature sensitive linear actuator assembly coupled to said valve, said resettable temperature sensitive linear actuator assembly comprising a shape memory alloy device for enabling said valve to move from an open position to a closed position when said shape memory alloy device is heated to a predetermined temperature; and
an actuator coupled to said valve and accessible from the exterior of said valve assembly housing for returning said valve to said open position.

19. A resettable thermal valve assembly according to claim 18 wherein said valve comprises:
a first shaft rotatably mounted in said valve assembly housing;
a flapper fixedly coupled to said first shaft for rotating from a first position corresponding to said open position and a second position corresponding to said closed position; and
a resilient member coupled to said flapper for biasing said flapper into said second position.

20. A resettable thermal valve assembly according to claim 19 further comprising a lever arm fixedly coupled at a first end thereof to said first shaft and configured to be supported at a second end thereof by said temperature sensitive linear actuator assembly.

21. A resettable thermal valve assembly according to claim 20 wherein said temperature sensitive linear actuator assembly comprises:
a linear actuator housing;
a support shaft having a first end portion configured for longitudinal movement within said linear actuator housing and having a second end portion extending from said linear actuator housing, said support shaft configured to translate between an extended position for supporting said lever arm and a retracted position for releasing said lever arm; and
a shape memory alloy device positioned within said linear actuator housing and coupled to said first end portion for moving said support shaft from said extended position to said retracted position when said shape memory alloy device reaches said predetermined temperature.

22. A resettable thermal valve assembly according to claim 21 wherein said temperature sensitive linear actuator further comprises:
a support shaft biasing member within said linear actuator housing for moving said support shaft from said extended position to said retracted position; and
a release mechanism configured for slidable movement within said linear actuator housing from a first location to maintain said support shaft in said extended position to a second location to maintain said support shaft in said retracted position, said first location to oppose said support shaft biasing member and said second location to release said support shaft biasing member, said release mechanism coupled to said shape memory alloy device and configured to be moved thereby from said first location to said second location when said shape memory alloy device reaches said predetermined temperature.

23. A resettable thermal valve assembly according to claim 22 wherein first end portion of said support shaft has a receiving cavity therein and said release mechanism further comprises a locking mechanism which engages said support shaft proximate said receiving cavity to maintain the support shaft in its extended position when said release mechanism is in said first location, and is at least partially received within said receiving cavity when said release mechanism moves to said second location.

* * * * *

UNITED STATES PATENT AND TRADEMARK OFFICE
CERTIFICATE OF CORRECTION

PATENT NO. : 7,219,687 B2  Page 1 of 1
APPLICATION NO. : 10/916799
DATED : May 22, 2007
INVENTOR(S) : Vasquez et al.

It is certified that error appears in the above-identified patent and that said Letters Patent is hereby corrected as shown below:

Title page, Item (57)
Abstract, line 6, "close" should be changed to --closed--.

Signed and Sealed this

Seventh Day of August, 2007

JON W. DUDAS
*Director of the United States Patent and Trademark Office*